US008751083B2

(12) United States Patent
Huntzicker

(10) Patent No.: US 8,751,083 B2
(45) Date of Patent: Jun. 10, 2014

(54) ELECTRIC VEHICLE CHARGE REDUCTION APPARATUS AND METHOD

(75) Inventor: Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 13/358,866

(22) Filed: Jan. 26, 2012

(65) Prior Publication Data

US 2013/0197730 A1 Aug. 1, 2013

(51) Int. Cl.
*B60W 20/00* (2006.01)
*B60W 10/06* (2006.01)
*B60L 11/16* (2006.01)
*B60L 11/18* (2006.01)
*B60L 15/20* (2006.01)
*B60L 7/10* (2006.01)
*B60L 11/12* (2006.01)
*B60W 10/08* (2006.01)
*B60W 10/26* (2006.01)

(52) U.S. Cl.
CPC ............. *B60L 11/16* (2013.01); *B60L 11/1887* (2013.01); *B60L 15/2027* (2013.01); *B60L 7/10* (2013.01); *B60L 11/12* (2013.01); *B60L 11/18* (2013.01); *B60W 10/06* (2013.01); *B60W 10/08* (2013.01); *B60W 10/26* (2013.01); *B60W 20/00* (2013.01); *Y10S 903/903* (2013.01)
USPC .......................... 701/22; 180/65.265; 903/903

(58) Field of Classification Search
CPC . B60L 11/16; B60L 11/1887; B60L 15/2027; B60L 7/10; B60L 11/12; B60L 11/18; B60L 2240/12; B60L 2240/423; B60L 2240/622; B60L 2250/26; B60W 20/00; B60W 10/06; B60W 10/08; B60W 10/26; Y02T 90/16; Y02T 90/162; Y02T 90/34; Y02T 10/642
USPC .................................. 701/22, 533; 180/65.29
See application file for complete search history.

(56) References Cited

U.S. PATENT DOCUMENTS

| 2008/0027639 A1* | 1/2008 | Tryon ........................... 701/209 |
| 2009/0114463 A1* | 5/2009 | DeVault ..................... 180/65.29 |
| 2010/0280687 A1 | 11/2010 | Tate, Jr. et al. |

FOREIGN PATENT DOCUMENTS

| DE | 10128758 A1 | 12/2002 |
| DE | 102009028922 A1 | 3/2011 |
| DE | 102009040586 A1 | 3/2011 |

* cited by examiner

*Primary Examiner* — Marthe Marc-Coleman
(74) *Attorney, Agent, or Firm* — Quinn Law Group, PLLC

(57) ABSTRACT

A vehicle includes a rechargeable energy storage device, such as a battery. A recharging system is operatively connected to the energy storage device and configured to selectively charge the energy storage device by transmitting energy thereto. A regenerative braking system is operatively connected to the energy storage device to selectively transmit energy thereto. A controller is operatively connected to the recharging system and configured to control the recharging system. The controller is configured to determine an amount of the vehicle's gravitational potential energy that is recoverable by the regenerative braking system over a predicted route, and to control the recharging system such that the amount of energy transferred from the recharging system to the energy storage device is based on the amount of the vehicle's gravitational potential energy that is recoverable by the regenerative braking system over the predicted route.

20 Claims, 2 Drawing Sheets

US 8,751,083 B2

ELECTRIC VEHICLE CHARGE REDUCTION APPARATUS AND METHOD

TECHNICAL FIELD

This invention relates to apparatuses and methods for charging electric vehicles.

BACKGROUND

An electric vehicle includes a battery, which stores energy used to power an electric motor and thereby drive the vehicle. The battery is rechargeable to replenish the amount of stored energy. An electric vehicle may be configured to receive electrical energy from an offboard source (such as the electric utility grid) to recharge the battery. Some electric vehicles, e.g., hybrid electric vehicles, may also be configured to charge the battery from an onboard source, such as an engine-driven generator or fuel cell. A regenerative braking system may also be used to convert the kinetic energy of the vehicle to electrical energy for recharging the battery.

SUMMARY

A vehicle includes a rechargeable energy storage device; a recharging system operatively connected to the energy storage device and configured to selectively charge the energy storage device by transmitting energy thereto; a regenerative braking system operatively connected to the energy storage device to selectively transmit energy thereto; and a controller operatively connected to the recharging system and configured to control the recharging system.

The controller is configured to determine an amount of the vehicle's gravitational potential energy that is recoverable by the regenerative braking system over a predicted route. The controller is also configured to control the recharging system such that the amount of energy transferred from the recharging system to the energy storage device is based on the amount of the vehicle's gravitational potential energy that is recoverable by the regenerative braking system over the predicted route.

The controller may thus reduce the amount of energy obtained from an onboard or offboard energy source without any change to the range or performance of the vehicle. The controller also thereby reduces the charging time of the battery. A corresponding method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
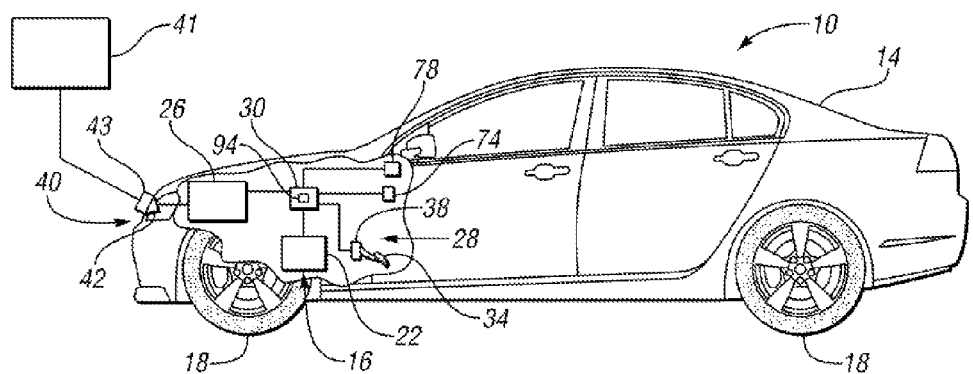
FIG. 1 is a schematic, partial cutaway, side view of an electric vehicle.

Referring to FIG. 1, a vehicle 10 includes a vehicle body 14. Four ground-engaging wheels 18 are rotatably mounted with respect to the body 14. A powertrain 16 includes a motor/generator 22 that is operatively connected to at least one of the wheels 18 to transmit torque thereto and thereby propel the vehicle 10. The rotor of the motor/generator 22 may, for example, be directly connected to the wheel 18, via a transmission that provides different speed ratios, etc.

The vehicle 10 also includes a battery 26 that is configured to store energy in chemical form, and to transform the chemical energy to electrical energy. The battery 26 is operatively connected to the motor/generator 22 to selectively transmit energy thereto. The motor/generator 22 is configured to transform the electrical energy from the battery 26 into mechanical energy that drives the wheel 18. The battery 26 is thus an energy storage device that is configured to supply energy to the powertrain 16 to drive one or more of the wheels 18. Other energy storage devices that are rechargeable (i.e., devices in which the stored energy is replenishable) may be employed within the scope of the claimed invention, such as bi-directional fuel cells, flywheels, etc.

The motor/generator 22 is also part of a regenerative braking system 28 that is configured to selectively transform the kinetic energy and/or potential energy of the vehicle 10 into electrical energy to recharge the battery 26. More specifically, the motor/generator 22 selectively recovers the kinetic and/or potential energy of the vehicle 10 by transforming rotational mechanical energy from the wheel 18 into electrical energy and transmitting the electrical energy to the battery 26, thereby charging the battery 26 (i.e., storing the recovered energy in the battery 26 as chemical energy).

More specifically, the regenerative braking system 28 in the embodiment depicted includes an electronic controller 30 and a braking system input device. The braking system input device in the embodiment depicted is a brake pedal 34 located within the passenger compartment of the vehicle body 14. The brake pedal 34 is selectively depressible by a driver of the vehicle 10. The pedal 34 is operatively connected to at least one sensor 38 that is configured to obtain information about the brake pedal's position (e.g., the amount the brake pedal 34 is depressed, the rate of depression of the brake pedal 34, etc.), and to transmit the information about the brake pedal's position to the controller 30. The controller 30 is configured to use the information about the brake pedal's position to determine whether to cause the motor/generator 22 to transform the mechanical rotational energy from the wheel 18 into electrical energy and, if so, at what rate.

Thus, if the regenerative braking system 28 is used to reduce the speed of the vehicle 10, then the regenerative braking system 28 converts kinetic energy of the vehicle 10 to electrical energy that recharges the battery 26. If the regenerative braking system 28 is used to maintain the vehicle 10 at a constant speed while the vehicle 10 is travelling downhill, then the regenerative braking system 28 converts gravitational potential energy of the vehicle 10 to electrical energy that recharges the battery 26.

The vehicle 10 also includes a battery recharging system 40 that is operatively connected to the battery 26 and configured to selectively charge the battery 26 by transmitting energy thereto. In the embodiment of FIG. 1, the recharging system 40 is configured to receive energy from an offboard source 41 (such as the electric utility grid, etc.) and to transmit the energy from the offboard source 41 to, and thereby charge, the battery 26. In one embodiment, the recharging system 40 includes an electrical connector 42 that is in selective electrical communication with the battery 26 and that is configured to connect to a complimentary electrical connector 43. The complimentary electrical connector 43 is operatively connected to the offboard source 41 to receive energy therefrom.

Thus, when the electrical connector 42 is operatively connected to the complimentary electrical connector 43, the battery 26 may be in electrical communication with the offboard source 41 for recharging.

In another embodiment (not shown), the battery recharging system 40 is configured to receive energy from the offboard source 41 via electromagnetic induction. The controller 30 is operatively connected to the recharging system 40 such that the controller 30 controls the recharging system 40. More specifically, the flow or transfer of energy from the recharging system 40 to the battery 26 is controllable by the controller 30.

Figure 2:
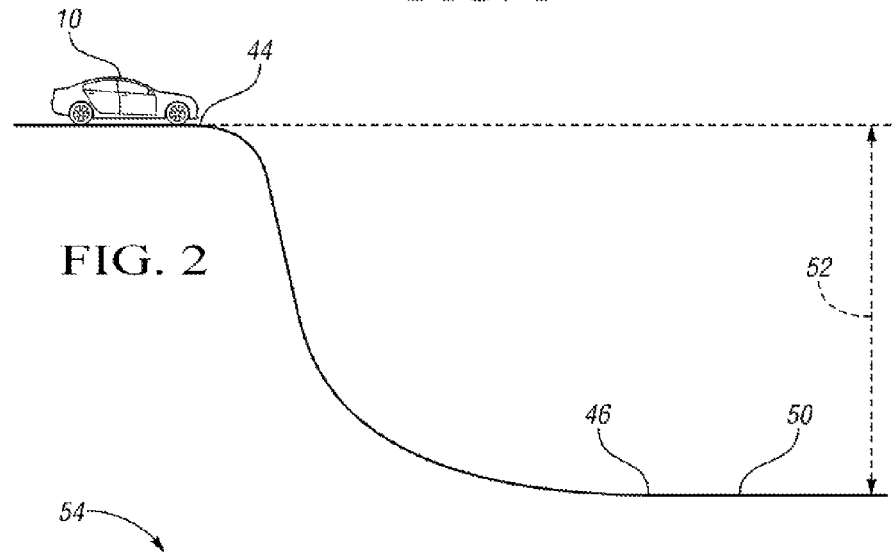
FIG. 2 is a schematic, side view of the electric vehicle of FIG. 1 in a charging location, and a route from the charging location to a desired destination.

Referring to FIG. 2, wherein like reference numbers refer to like components from FIG. 1, the vehicle 10 is characterized by gravitational potential energy. For example, in FIG. 2, a route 46 extends from a starting location 44, or beginning, of the route 46 to an ending location 50, or destination. The ending location 50 is downhill from the starting location 44; accordingly, the vehicle 10 possesses gravitational potential energy at the starting location 44 relative to the ending location 50. If the vehicle 10 travels the route 46 from the starting location 44 to the ending location 50, the vehicle 10 will travel a vertical distance 52 downward, during which the gravitational potential energy will be converted to other forms of energy such as, for example, kinetic energy (increased vehicle speed), waste heat, etc. At least some of the gravitational potential energy that the vehicle 10 possesses at location 44 can be converted to electrical energy by the regenerative braking system 28 and used to charge the battery 26.

However, the battery 26 is characterized by a maximum energy storage capacity. As used herein, the "maximum energy storage capacity" of a battery 26 is the maximum amount of energy that the battery can store as chemical energy for later conversion to electrical energy. When the battery 26 has been charged to its maximum energy storage capacity, it is fully charged and cannot store additional energy. Accordingly, if the battery 26 is fully charged while the regenerative braking system 28 is transforming the kinetic or potential energy of the vehicle 10 into electrical energy, then the electrical energy from the braking system 28 cannot be stored in the battery 26, and therefore must be dissipated as waste heat or diverted in some other manner. Thus, in the situation shown in FIG. 2, if the battery 26 is fully charged at the starting location 44, then none of the gravitational potential energy of the vehicle 10 at location 44 will be recoverable as stored electrical energy in the battery 26.

The controller 30 is configured to control the recharging system 40 such that the amount of energy transferred from the recharging system 40 to the battery 26 is based on the amount of the vehicle's gravitational potential energy that is recoverable by the regenerative braking system 28 over a predicted route 46, thereby ensuring that the battery can accommodate at least some of the gravitational potential energy of the vehicle 10 as it is transformed by the regenerative braking system 28 into electrical energy.

Figure 3:
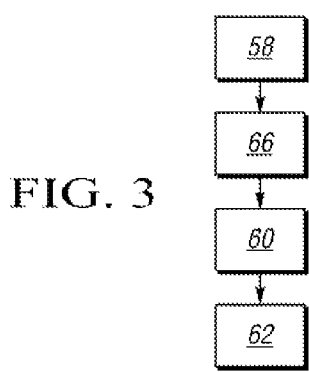
FIG. 3 is a flow chart depicting a method for use with the vehicle of FIG. 1.

More specifically, the controller 30 in the embodiment depicted is configured to limit the amount of charge in the battery 26 during recharging so that the battery 26 has sufficient capacity to store at least some of the gravitational potential energy that is recoverable while traversing the route 46. FIG. 3 schematically depicts a method 54 for limiting the amount of charge in the battery 26 so that the battery can accommodate the gravitational potential energy of the vehicle 10 that is recoverable by the recharging system 40 as the vehicle 10 travels the route 46. The method 54 is an exemplary control algorithm for the controller 30.

Referring to FIGS. 1-3, at step 58, the controller 30 is configured to determine the amount of the vehicle's gravitational potential energy that is recoverable by the regenerative braking system 28 over an expected or predicted route 46. The controller 30 is configured to then control the recharging system 40 such that the amount of energy transferred from the recharging system 40 to the battery 26 is based on the amount of the vehicle's gravitational potential energy that is recoverable by the regenerative braking system 28 over the predicted route 46.

More specifically, in one embodiment, the controller 30 charges the vehicle battery 26 with energy from the offboard source 41 via the recharging system 40 at the starting location 44 (step 60). At step 62, the controller 30 terminates the charging of the battery 26 via the recharging system 40 when the amount of stored energy in the battery 26 is the difference between the maximum energy storage capacity of the battery and the amount of the vehicle's gravitational potential energy that is recoverable by the regenerative braking system 28 over the expected route 46. Accordingly, the controller 30 reduces the amount of energy obtained from the offboard source 41 without any change to the range or performance of the vehicle 10, thereby increasing energy efficiency and reducing vehicle operating costs. The controller 30 also thereby reduces the charging time of the battery 26.

The route 46 shown in FIG. 2 is either downhill or level from the starting location 44 to the ending location 50. However, a route may, for example, include some uphill segments prior to a large downhill segment, or may include a significant level region prior to a large downhill segment. The vehicle 10 may thus require energy from the battery 26 to travel any uphill or level portions of a route that the vehicle 10 encounters prior to recovery of gravitational potential energy during a downhill segment of the route.

Accordingly, it may be desirable to maintain a predetermined minimum energy storage amount in the battery 26 to ensure that there is sufficient energy to propel the vehicle 10 across any significant uphill or level regions of the route prior to downhill regions of the route. Thus, step 62 may alternatively include causing the recharging system 40 to terminate charging the battery 26 when the amount of stored energy in the battery 26 is the larger of (1) the difference between the maximum energy storage capacity of the battery and the amount of the vehicle's gravitational potential energy that is recoverable by the regenerative braking system over the route, and (2) a predetermined minimum energy storage amount.

The predetermined minimum storage amount ensures that there is sufficient charge to enable the vehicle 10 to travel any uphill or level segments of a route prior to downhill segments of the route. The predetermined minimum energy storage amount may be selectively variable, depending on the particular features of an expected route.

In the embodiment depicted, the vehicle 10 includes a global positioning system (GPS) receiver 74, which is operatively connected to the controller 30. The controller 30 uses the GPS receiver 74 to determine the location 44 of the vehicle 10. Alternatively, the controller 30 may determine the location of the vehicle 10 from the vehicle driver or other vehicle user via a user-operable input/output device 78 disposed within the passenger compartment of the vehicle body 14. The vehicle driver or other user of the vehicle may input data corresponding to the vehicle's location (e.g., street address, latitude and longitude, etc.) to the input/output device 78, which transmits the data to the controller 30. Input and output devices 78 may include touch screen displays, microphones, keyboards, speakers, etc.

The method 54 may include confirming that the driver of the vehicle 10 intends to follow the route 46 at step 66. For example, if the input device 78 is a touch-screen display, the controller 30 may cause the device 78 to display a message inquiring whether the route 46 will be followed after charging.

Determining the amount of the vehicle's gravitational potential energy that is recoverable by the regenerative braking system 28 over the expected route 46 (step 58) may involve the vehicle 10 traveling the route 46 one or more times to obtain measurements prior to steps 60 and 62. For example, in one embodiment, the controller 30 is configured to perform step 58 by measuring a gain in the state of charge of the battery 26 when the vehicle 10 travels the expected route 46. For example, the vehicle 10 may travel the route 46 from the location 44 to the destination 50 with the battery depleted (i.e., no charge) at location 44. The charge of the battery 26 at the destination 50, as measured by the controller 30, is the amount of the vehicle's gravitational potential energy that is recoverable by the regenerative braking system 28 over the route 46.

Alternatively, determining the amount of the vehicle's gravitational potential energy that is recoverable by the regenerative braking system 28 over the expected route 46 (step 58) may include traversing the route 46 while the battery 26 is fully charged, and estimating the amount of energy that the regenerative braking system 28 would have generated and transmitted to the battery 26 over the route 46 if the battery 26 had not been fully charged. For example, if the battery 26 is fully charged at location 44, and then travels the route 46 to the destination 50, the controller 30 may calculate the amount of energy that would have been recaptured by the regenerative braking system 28 but for the fact that the battery 26 is at full capacity at various times over the route 46. The amount of energy that would have been recaptured by the regenerative braking system 28 but for the fact that the battery 26 is at full capacity may be measured or estimated indirectly. For example, the controller 30 may estimate the amount of energy based on how far the brake pedal 34 is depressed and for how long the brake pedal 34 is depressed.

Figure 4:
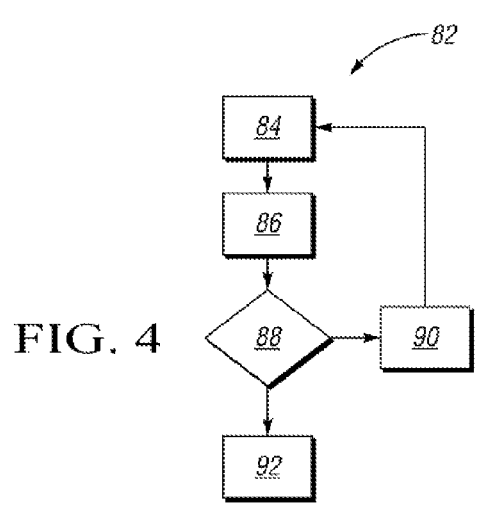
FIG. 4 is a flow chart depicting one embodiment of one of the method steps of FIG. 3.

In another alternative embodiment, the controller 30 may determine the amount of the vehicle's gravitational potential energy at step 58 by following the method 82 shown in FIG. 4. Referring to FIG. 4, the method 82 includes charging the battery 26 at the starting location 44 such that the battery 26 stores a predetermined amount (X) of energy (step 84). The method 82 also includes measuring the state of charge of the battery 26 (i.e., the amount of energy stored in the battery 26) at the ending location 50 after the vehicle 10 has followed route 46. The method 82 further includes inquiring (at step 88) whether the state of charge of the battery 26 measured at step 86 is less than full charge (i.e., whether the measured amount of energy stored in the battery 26 at step 86 is less than the maximum energy storage capacity of the battery 26). If the battery 26 is fully charged at step 88, then the controller 30 reduces the predetermined amount of energy (X) by another predetermined amount (Y). Thus, at step 90, the controller 30 recalculates the predetermined amount of energy to be added to the battery as $X=X-Y$.

If, at step 88 the state of charge of the battery 26 measured at step 86 is less than full charge (i.e., whether the measured amount of energy stored in the battery 26 at step 86 is less than the maximum energy storage capacity of the battery 26), then the controller 30 proceeds to step 92. At step 92, the controller 30 records the last value of X (i.e., the predetermined amount of energy stored in the battery at the last iteration of step 84) as the amount of the vehicle's gravitational potential energy at the starting location 44 that is recoverable by the regenerative braking system 28 over the route 46 from the starting location 44 to the destination.

Accordingly, in FIG. 4, the controller 30 iteratively charges the battery 26 at the starting location 44 to store a predetermined amount of energy, and measures the amount of energy stored by the battery 26 at the ending location 50 after the vehicle has traveled the route 46. The predetermined amount of energy is reduced in each successive charging until the amount of energy in the battery 26 at the ending location 50 is less than the maximum energy storage capacity of the battery 26.

Referring again to FIGS. 1-3, in another alternative embodiment, the controller 30 determines the amount of the vehicle's gravitational potential energy at the starting location 44 that is recoverable by the regenerative braking system 28 over the route 46 by using a database 94 (stored in a data storage medium) that stores information regarding the elevations of various locations or routes. In yet another alternative embodiment, the controller 30 is configured to determine the amount of the vehicle's gravitational potential energy at the starting location 44 that is recoverable by the regenerative braking system 28 over the route 46 by measuring, as the vehicle 10 travels the route from the ending location 50 to the starting location 44, how much energy is expended by the vehicle 10 to propel itself.

Since many of the ways of performing step 58 require that the vehicle 10 travel the route 46 before a charge reduction is implemented, a method of prompting the controller 30 to initiate step 58 may be desirable. For example, the vehicle user may instruct the controller 30 to perform step 58 via the input device 78, and also provide the starting location and the destination. The controller 30 may also prompt itself by recording and analyzing charge location and destinations.

In another embodiment, the controller 30 may communicate the results of step 58 to the user via device 78, and then the user may manually input a desired charge reduction. The vehicle user may also use telematics or the internet to instruct the controller 30 to perform any of steps 58-62.

Figure 5:
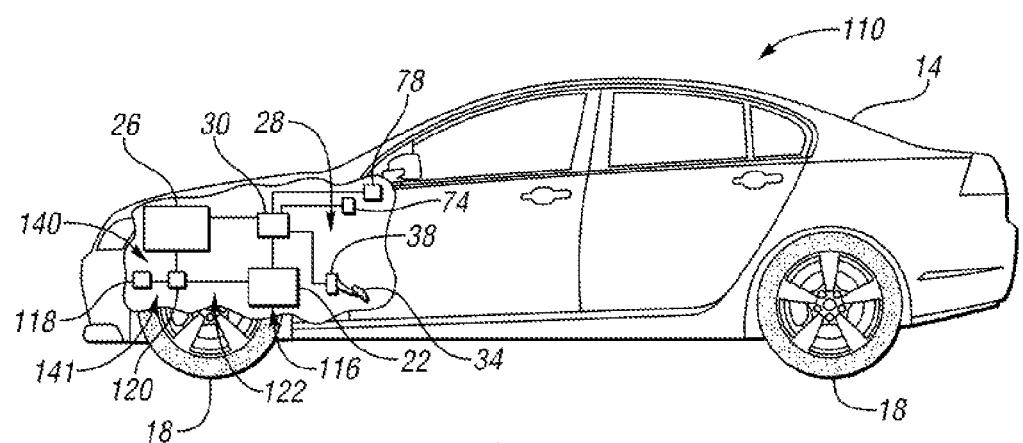
FIG. 5 is a schematic, partial cutaway, side view of another electric vehicle in accordance with the claimed invention.

The vehicle 10 of FIG. 1 is depicted as a battery-electric vehicle, in which the powertrain does not include an engine, and the battery 26 is the only source of energy for the powertrain 16. Alternatively, a vehicle may be a hybrid electric vehicle, in which the vehicle includes an onboard source of electrical energy to selectively charge a battery. Referring to FIG. 5, wherein like reference numbers refer to like components from FIG. 1, a vehicle 110 is substantially identical to the vehicle 10 of FIG. 1, except that the powertrain 116 includes an onboard source 141 of electrical energy configured to selectively transmit electrical energy to the battery 26.

The onboard source 141 in the embodiment depicted includes an engine 118 and a generator 120. The engine 118 is operatively connected to the generator 118 to selectively provide mechanical power to the generator 120. The generator 120 is operatively connected to the electric battery 26 to selectively transmit electrical energy thereto for recharging. The generator 120 may also be operatively connected to the motor/generator 22 to supply electrical energy to the motor/generator in a series hybrid configuration. Parallel hybrid configurations may also be employed within the scope of the claimed invention. The recharging system 140 of the vehicle 110 thus includes the engine 118 and the generator 120. The body 14 defines an engine compartment 122, and the engine 118 and the generator 120 are disposed within the engine compartment 122.

The controller 30 is operatively connected to the recharging system 140 and is configured to selectively control the recharging system 140. The controller 30 is also configured to perform the steps shown in FIGS. 3 and 4. The recharging system 140 charges the battery 26 during operation of the vehicle 110, and thus the controller 30 may require input regarding the expected route 46 earlier than in the embodiment of FIG. 1. For example, the controller 30 may ask the vehicle user (via the input/output device 78) to confirm whether the user intends to drive from location 50 to location 46, and then from location 46 to location 50. If the answer is yes, then the controller 30 will limit the charging of the battery 26 by the engine 118 and generator 120 while the vehicle is traveling from location 50 to location 46 to ensure that, when the vehicle 10 later travels from location 46 to location 50, the battery 26 can accommodate the gravitational potential energy recoverable by the regenerative braking system 28.

It should be noted that, within the scope of the claimed invention, a vehicle with a hybrid powertrain having an onboard source of electrical energy may also have a recharging system that is configured to receive energy from an offboard energy source, i.e., a "plug-in hybrid." Thus, for example, the vehicle 110 may include an electrical connector such as the one shown at 42 in FIG. 1 to transfer energy from an offboard source to the battery 26.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a rechargeable energy storage device;
a recharging system operatively connected to the energy storage device and configured to selectively charge the energy storage device by transmitting energy thereto;
a regenerative braking system operatively connected to the energy storage device to selectively transmit energy thereto; and
a controller operatively connected to the recharging system and configured to control the recharging system;
wherein the controller is configured to determine an amount of the vehicle's gravitational potential energy that is recoverable by the regenerative braking system over a predicted route; and
wherein the controller is configured to control the recharging system such that the amount of energy transferred from the recharging system to the energy storage device is based on the amount of the vehicle's gravitational potential energy that is recoverable by the regenerative braking system over the predicted route.

2. The vehicle of claim 1, wherein the energy storage system is an electric battery.

3. The vehicle of claim 2, wherein the recharging system includes an onboard source of electrical energy configured to selectively transmit electrical energy to the battery.

4. The vehicle of claim 3, wherein the onboard source includes an engine and a generator;
wherein the engine is operatively connected to the generator to selectively provide power to the generator;
wherein the generator is operatively connected to the electric battery to selectively transmit electrical energy thereto.

5. The vehicle of claim 4, further comprising a vehicle body defining an engine compartment; and wherein the engine is at least partially disposed within the engine compartment.

6. The vehicle of claim 2, wherein the recharging system is configured to receive energy from an offboard source.

7. The vehicle of claim 2, wherein the battery has a maximum energy storage capacity; and
wherein the controller is configured to cause the recharging system to terminate charging the battery when the amount of stored energy in the battery is the difference between the maximum energy storage capacity of the battery and the amount of the vehicle's gravitational potential energy that is recoverable by the regenerative braking system over the route.

8. The vehicle of claim 2, wherein the battery has a maximum energy storage capacity; and
wherein the controller is configured to cause the recharging system to terminate charging the battery when the amount of stored energy in the battery is the larger of (1) the difference between the maximum energy storage capacity of the battery and the amount of the vehicle's gravitational potential energy that is recoverable by the regenerative braking system over the route, and (2) a predetermined minimum energy storage amount.

9. The vehicle of claim 2, wherein the controller is configured to determine the amount of the vehicle's gravitational potential energy that is recoverable by the regenerative braking system by measuring a gain in the energy stored by the battery when the vehicle travels the route.

10. The vehicle of claim 2, wherein the controller is configured to determine the amount of the vehicle's gravitational potential energy that is recoverable by the regenerative braking system by traversing the route while the battery is fully charged, and estimating the amount of energy that the regenerative braking system would have generated and transmitted to the battery over the route if the battery had not been fully charged.

11. The vehicle of claim 2, wherein the route has a starting location and an ending location;
wherein the battery has a maximum energy storage capacity;
wherein the controller is configured to determine the amount of the vehicle's gravitational potential energy that is recoverable by the regenerative braking system by iteratively charging the battery at the starting location to store a predetermined amount of energy and measuring the amount of energy stored by the battery at the ending location; and
wherein the predetermined amount of energy is reduced in each successive charging until the amount of energy in the battery at the ending location is less than the maximum energy storage capacity of the battery.

12. The vehicle of claim 2, wherein the route has a starting location and an ending location; and
wherein the controller is configured to determine the amount of the vehicle's gravitational potential energy that is recoverable by the regenerative braking system by determining the gravitational potential energy of the starting location relative to the ending location using a database.

13. The vehicle of claim 2, wherein the route includes a starting location; and
wherein the controller is configured to determine the amount of the vehicle's gravitational potential energy that is recoverable by the regenerative braking system by measuring the amount of energy used by the vehicle to travel the route to the starting location.

14. A method for use with a vehicle having a rechargeable battery and a regenerative braking system configured to selectively transmit energy to the battery, the method comprising:

determining the amount of the vehicle's gravitational potential energy that is recoverable by the regenerative braking system over a predicted route;

charging the battery; and terminating charging the battery when the amount of energy stored by the battery is sufficiently less than the maximum energy storage capacity of the battery such that the battery can accommodate the amount of the vehicle's gravitational potential energy that is recoverable by the regenerative braking system over the predicted route.

15. The method of claim 14, wherein said determining the amount of the vehicle's gravitational potential energy that is recoverable by the regenerative braking system includes measuring a gain in the energy stored by the battery when the vehicle travels the route.

16. The method of claim 14 wherein said determining the amount of the vehicle's gravitational potential energy that is recoverable by the regenerative braking system includes traversing the route while the battery is fully charged, and estimating the amount of energy that the regenerative braking system would have generated and transmitted to the battery over the route if the battery had not been fully charged.

17. The method of claim 14, wherein the battery has a maximum energy storage capacity;

wherein said determining the amount of the vehicle's gravitational potential energy that is recoverable by the regenerative braking system includes iteratively charging the battery at the starting location of the route to store a predetermined amount of energy and measuring the amount of energy stored by the battery at the end of the route;

wherein the predetermined amount of energy is reduced in each successive charging until the amount of energy in the battery at the end of the route is less than the maximum energy storage capacity of the battery.

18. The method of claim 14, wherein said determining the amount of the vehicle's gravitational potential energy that is recoverable by the regenerative braking system includes determining the gravitational potential energy of the starting location of the route using a database.

19. The method of claim 14, wherein said determining the amount of the vehicle's gravitational potential energy that is recoverable by the regenerative braking system includes measuring the amount of energy used by the vehicle to travel to the starting location of the route.

20. A vehicle comprising:

a battery;

a recharging system operatively connected to the battery and configured to selectively charge the battery by transmitting energy thereto;

a regenerative braking system configured to selectively receive energy from an offboard source and operatively connected to the battery to selectively transmit energy thereto; and a controller operatively connected to the recharging system and configured to control the recharging system;

wherein the controller is configured to determine an amount of the vehicle's gravitational potential energy that is recoverable by the regenerative braking system over a predicted route; and wherein the controller is configured to control the recharging system such that the amount of energy transferred from the recharging system to the battery is based on the amount of the vehicle's gravitational potential energy that is recoverable by the regenerative braking system over the predicted route.

\* \* \* \* \*